United States Patent
Jammoussi et al.

(10) Patent No.: US 10,928,195 B2
(45) Date of Patent: Feb. 23, 2021

(54) WHEEL DIAGNOSTIC

(71) Applicant: Ford Global Technologies, LLC, Dearborn, MI (US)

(72) Inventors: Hassene Jammoussi, Canton, MI (US); Imad Hassan Makki, Dearborn Heights, MI (US); John Steven McWilliams, Southgate, MI (US); Bruce C. Arnold, Whitmore Lake, MI (US); Daniel F. Slavin, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 159 days.

(21) Appl. No.: 16/100,026

(22) Filed: Aug. 9, 2018

(65) Prior Publication Data
US 2020/0049499 A1    Feb. 13, 2020

(51) Int. Cl.
G01B 21/26 (2006.01)
G07C 5/02 (2006.01)
G01B 21/24 (2006.01)

(52) U.S. Cl.
CPC ............ *G01B 21/26* (2013.01); *G01B 21/24* (2013.01); *G07C 5/02* (2013.01)

(58) Field of Classification Search
CPC .......... G01B 21/24; G01B 21/26; G07C 5/02; B60W 50/0205
USPC ...................................................... 701/34.4
See application file for complete search history.

(56) References Cited

U.S. PATENT DOCUMENTS

| | | | |
|---|---|---|---|
| 5,948,030 A | 9/1999 | Miller et al. | |
| 6,205,391 B1* | 3/2001 | Ghoneim | B60T 8/1755 |
| | | | 180/167 |
| 6,408,687 B1 | 6/2002 | Ashrafi et al. | |
| 6,650,980 B2 | 11/2003 | Ashrafi | |
| 6,789,017 B2 | 9/2004 | Aanen et al. | |
| 7,698,031 B2 | 4/2010 | Stevenson | |
| 8,706,347 B2* | 4/2014 | Bae | G01B 21/26 |
| | | | 701/31.4 |
| 2019/0164362 A1* | 5/2019 | Javid | G01M 17/06 |

OTHER PUBLICATIONS

Biesel, Recursive Calculation of the Standard Deviation with Increased Accuracy, Apr. 1977, Chromatographia, vol. 10, No. 4 (Year: 1977).*
IN2011CH04092A; Application fled Nov. 28, 2011; "A Method for Detecting Steering Misalignment in a Vehicle".
Larsen, "Real-Time Calibration of the Steering Wheel Angle Sensor", Master of Science Thesis in Electrical Engineering, Department of Electrical Engineering, Linkoping University, 2017.

* cited by examiner

*Primary Examiner* — Nadeem Odeh
(74) *Attorney, Agent, or Firm* — Ray Coppiellie; Bejin Bieneman PLC (57) ABSTRACT

A system includes a computer including a processor and a memory, the memory storing instructions executable by the computer to determine a recursive standard deviation and a recursive mean offset of a plurality of steering component angles and to identify a wheel misalignment fault upon determining that the recursive standard deviation is below a deviation threshold and the recursive mean offset is above an offset threshold.

20 Claims, 7 Drawing Sheets

WHEEL DIAGNOSTIC

BACKGROUND

Wheels in a vehicle are typically aligned to allow the vehicle to move substantially straight ahead when a steering wheel is at a neutral position. During operation of the vehicle, one or more of the wheels may become misaligned, causing the vehicle to move away from straight ahead motion. To compensate, a user may rotate the steering wheel away from the neutral position. Misaligned wheels can damage to wheels and other vehicle parts, and increase maintenance needed for the vehicle.

DETAILED DESCRIPTION

A system includes a computer including a processor and a memory, the memory storing instructions executable by the computer to determine a recursive standard deviation and a recursive mean offset of a plurality of steering component angles and to identify a wheel misalignment fault upon determining that the recursive standard deviation is below a deviation threshold and the recursive mean offset is above an offset threshold.

The instructions can further include instructions to determine a vehicle yaw rate and to determine the recursive standard deviation and the recursive mean offset upon determining that the vehicle yaw rate is below a yaw rate threshold.

The instructions can further include instructions to increment a yaw counter upon determining that the yaw rate is below the yaw rate threshold and to determine the recursive standard deviation and the recursive mean offset upon determining that the yaw counter exceeds a yaw counter threshold.

The instructions can include instructions to reset the yaw counter upon determining that the yaw rate exceeds the yaw rate threshold.

The instructions further can include instructions to determine a roll angle based on a lateral acceleration and a vertical acceleration and to determine the recursive standard deviation and the recursive mean offset upon determining that the roll angle is below a roll angle threshold.

The instructions can further include instructions to collect a second plurality of steering component angles upon determining that the recursive standard deviation is above the deviation threshold.

The instructions can further include instructions to determine that a vehicle is moving straight and then to determine the recursive standard deviation and the recursive mean offset of the plurality of steering component angles.

The instructions can further include instructions to determine that a vehicle speed is above a speed threshold and then to determine the recursive standard deviation and the recursive mean offset of the plurality of steering component angles.

The plurality of steering component angles can be a plurality of steering wheel angles. The plurality of steering component angles can be a plurality of steering pinion angles.

The plurality of steering component angles can be an ordered set of steering component angles including a first steering component angle and a last steering component angle.

The instructions to determine the recursive standard deviation can further include instructions to determine a first standard deviation based on the first steering component angle and a second steering component angle in the ordered set of steering component angles, to determine a second standard deviation based on the first standard deviation and a third steering component angle, and to determine the recursive standard deviation based on a last steering component angle and a penultimate standard deviation.

A method includes determining a recursive standard deviation and a recursive mean offset of a plurality of steering component angles and identifying a wheel misalignment fault upon determining that the recursive standard deviation is below a deviation threshold and the recursive mean offset is above an offset threshold.

The method can further include determining a vehicle yaw rate and determining the recursive standard deviation and the recursive mean offset upon determining that the vehicle yaw rate is below a yaw rate threshold.

The method can further include determining a roll angle based on a lateral acceleration and a vertical acceleration and determining the recursive standard deviation and the recursive mean offset upon determining that the roll angle is below a roll angle threshold.

The method can further include determining that a vehicle is moving straight and then determining the recursive standard deviation and the recursive mean offset of the plurality of steering component angles.

A system includes a steering component movable to a steering component angle, means for determining a recursive standard deviation and a recursive mean offset of a plurality of steering component angles of the steering component, and means for identifying a wheel misalignment fault upon determining that the recursive standard deviation is below a deviation threshold and the recursive mean offset is above an offset threshold.

The system can further include means for determining a vehicle yaw rate and means for determining the recursive standard deviation and the recursive mean offset upon determining that the vehicle yaw rate is below a yaw rate threshold.

The system can further include means for determining a roll angle based on a lateral acceleration and a vertical acceleration and means for determining the recursive standard deviation and the recursive mean offset upon determining that the roll angle is below a roll angle threshold.

The system can further include means for determining that a vehicle is moving straight and means for determining, then, the recursive standard deviation and the recursive mean offset of the plurality of steering component angles.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Identifying a wheel misalignment fault with recursively-evaluated statistics allows a computer in a vehicle to quickly determine whether one or more wheels are misaligned using data available to the computer. Because a steering wheel angle can change to compensate for misaligned wheels, using steering wheel angle data can indicate that one or more wheels are misaligned. Thus, the computer can identify the wheel misalignment fault and mitigate wear from the misaligned wheels.

Figure 1:
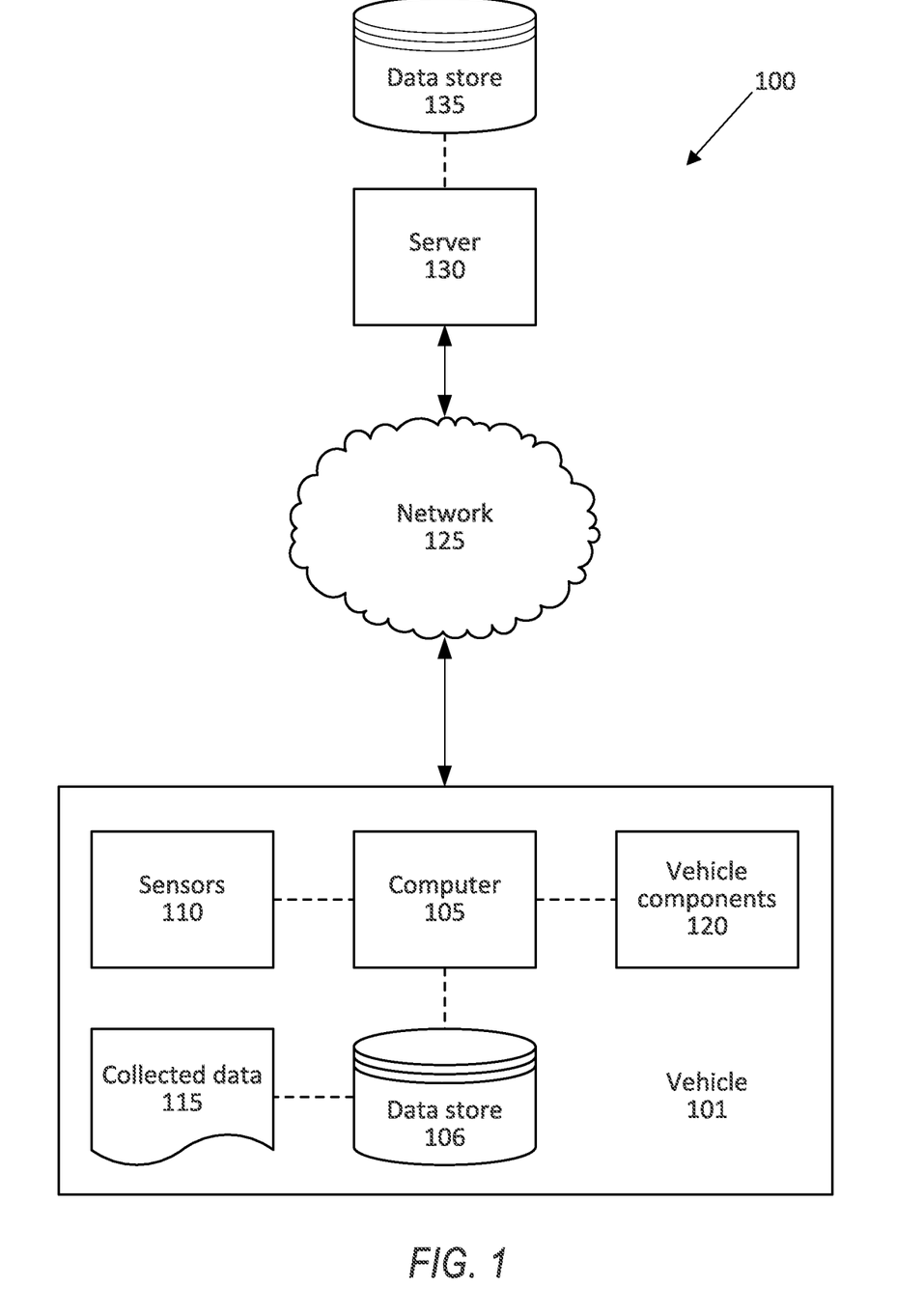
FIG. 1 is a block diagram of an example system for identifying a wheel misalignment fault.

FIG. 1 illustrates an example system 100 for identifying a wheel misalignment fault in a vehicle 101. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
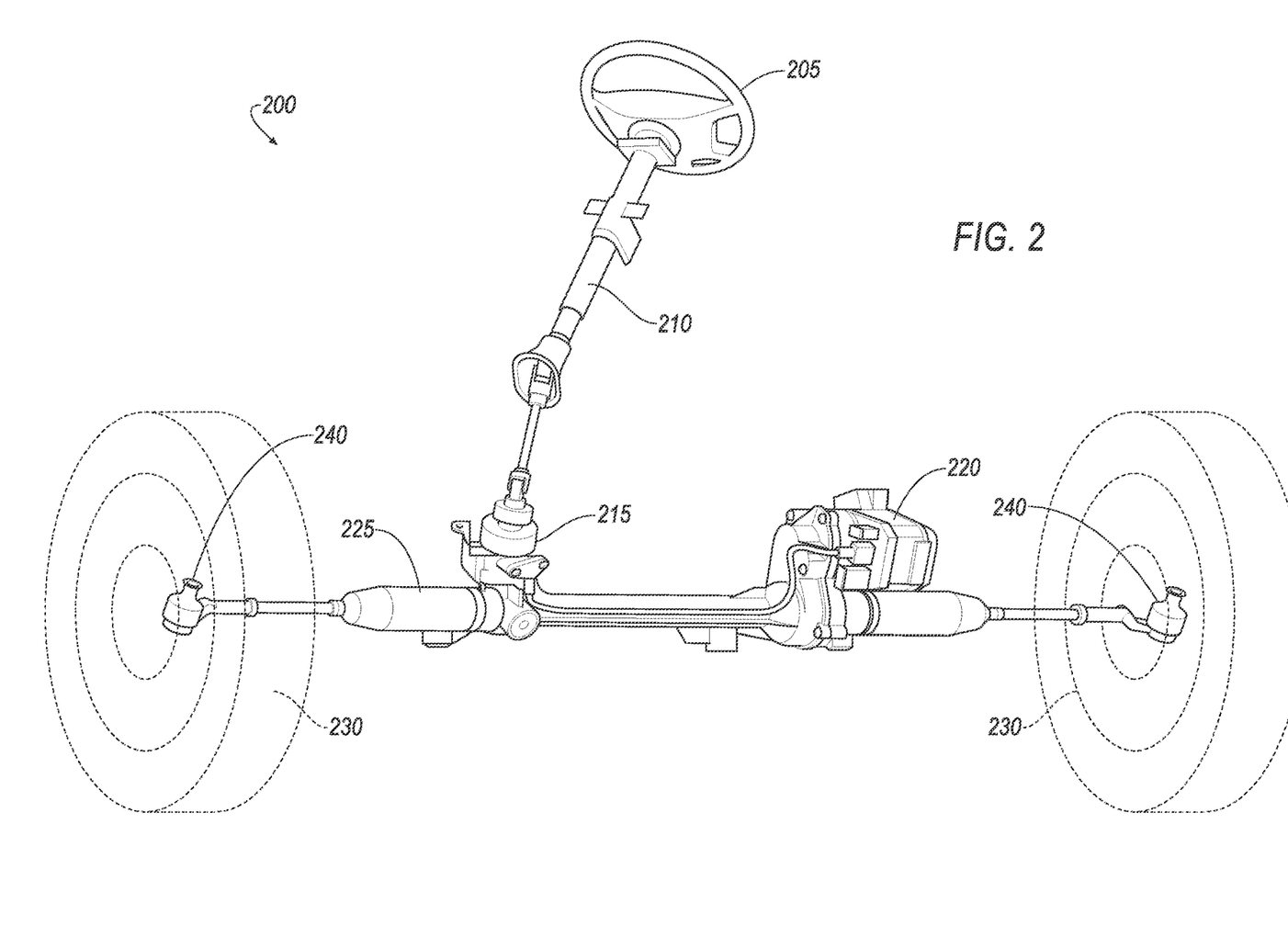
FIG. 2 is a perspective view of an example steering component.

FIG. 2 shows an example steering component 200. The steering component 200 can include a steering wheel 205, a steering column 210, a steering assist motor 215, a motor actuator 220, and a steering rack 225. The steering component 200 can move one or more wheels 230 to steer the vehicle 101.

Figure 3:
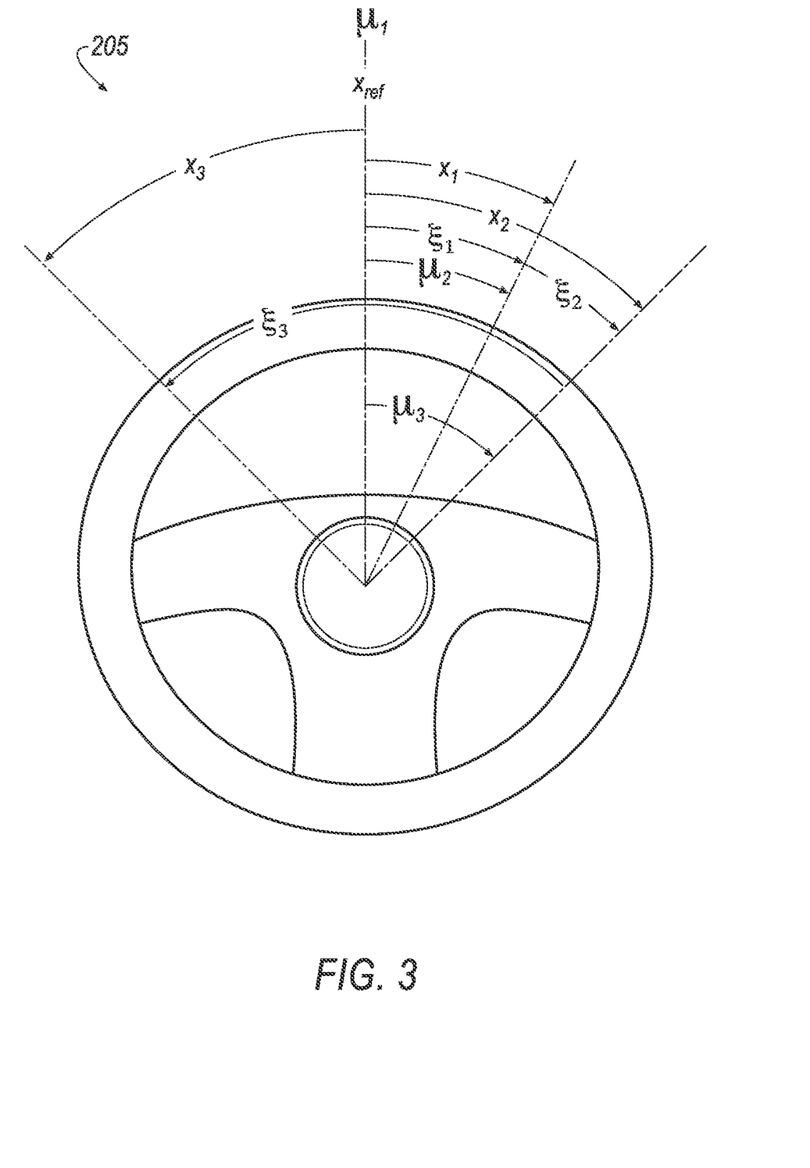
FIG. 3 is a view of an example steering wheel.

The steering component 200 can include the steering wheel 205. The steering wheel 205 allows an operator to steer the vehicle by transmitting rotation of the steering wheel 205 to movement of a steering rack 225. The user and/or the computer 105 can rotate the steering wheel 205 to the steering wheel angle, i.e., an angle of rotation of the steering wheel 205 relative to a predetermined (sometimes referred to as "default" or "nominal") orientation of the steering wheel 205. The predetermined orientation of the steering wheel 205, defining a steering wheel angle of 0 degrees, can be the orientation of the steering wheel 205 in which the vehicle 101 moves forward when all wheels 230 are aligned. The steering wheel 205 may be, e.g., a rigid ring fixedly attached to a steering column 210. FIG. 3 is a view of an example steering wheel 205 illustrating rotation of the steering wheel 205.

The steering component 200 can include the steering column 210. The steering column 210 transfers rotation of the steering wheel 205 to movement of the steering rack 225. The steering column 210 may be, e.g., a shaft connecting the steering wheel 205 to the steering rack 225.

The steering component 200 can include the steering assist motor 215 and the motor actuator 220. The motor actuator 220 can include a processor and a memory. The motor actuator 220 instructs the steering assist motor 215 to apply a torque to the steering column 210, providing power assist to the steering column 210. The steering assist motor 215 can provide torque in a direction in which the steering wheel 205 is rotated by the user, allowing the user to turn the steering wheel 205 with less effort. The steering assist motor 215 can be an electrically powered motor. The motor actuator 220 can include a sensor 110 that detects a motor angle of the steering assist motor 215. Based on the motor angle of the steering assist motor 215, the computer 105 can determine an absolute steering wheel angle x. The computer 105 can receive motor angle data 115 from the motor actuator 220 over the network 125. The motor angle data 115 can include an ordered set of steering assist motor angles. Each steering assist motor angle in the ordered set is an angle relative to an immediately previous steering motor angle in the ordered set.

The computer 105 can determine a steering component angle of the steering component 200. A steering component angle is defined herein as an angle of rotation of a component that accepts steering input, i.e., a steering wheel angle x or a steering pinion angle. Thus, the steering component angle may also be referred to as a steering input angle. The computer 105 can determine a relative steering wheel angle $\xi_{rel}$ from the rotation of the steering assist motor 215. A "relative" steering wheel angle $\xi_{rel}$ is a change in the steering wheel angle relative to an immediately previously determined steering wheel angle, as shown in FIG. 3. For example, a sensor 110 can detect a change in the steering wheel angle from a previous position of the steering wheel 205, i.e., the relative change of the steering wheel 205. In general, the relative steering wheel angle $\xi_{rel}$ is related to a steering assist motor angle according to a transfer function of a conventional Electronic Power Assist Steering model. The motor actuator 220 can, upon determining the steering assist motor angle, determine the relative steering wheel angle $\xi_{rel}$ with the transfer function and communicate the relative steering wheel angle $\xi_{rel}$ to the computer 105. Alternatively or additionally, the motor actuator 220 can determine a steering pinion angle of a steering pinion (not shown) based on steering assist motor angle and can communicate the steering pinion angle to the computer 105.

The computer 105 can determine an absolute steering wheel angle x. An "absolute" steering wheel angle is an angle of rotation of the steering wheel 205 relative to a position of the steering wheel 205 with no rotation, as shown in FIG. 3. As described above, the computer 105 can determine the relative steering wheel angle $\xi_{rel}$ based on motor angle data of the steering assist motor 215. The relative steering wheel angle $\xi_{rel}$ is the change in the steering wheel angle resulting from the most recent actuation of the steering motor 215. If the steering wheel 205 is already rotated upon actuation of the steering motor 215, i.e., the absolute steering wheel angle x is nonzero, then the relative steering angle $\xi_{rel}$ can capture only the current change in the absolute steering wheel angle x and not the entire absolute steering wheel angle x.

The computer 105 can determine an offset μ of the steering wheel 205. The offset μ is the difference between the absolute steering wheel angle x and the relative steering wheel angle $\xi_{rel}$, i.e., $\mu = x - \xi_{rel}$, as shown in FIG. 3. Thus, the computer 105 can determine the absolute steering wheel angle x based on a determined relative steering wheel angle $\xi_{rel}$ and a determined offset μ.

The computer 105 can determine an initial offset $\mu_0$ based on a reference absolute steering wheel angle $x_{ref}$. The reference absolute steering wheel angle $x_{ref}$ is a predetermined steering wheel angle stored in the data store 106 that corresponds to the vehicle 101 moving straight with properly aligned wheels 230, e.g., 0 degrees.

The computer 105 can identify a wheel misalignment fault. As used herein, a "wheel misalignment fault" is a detection of misaligned wheels 230 in the vehicle 101. When the wheels 230 are aligned, the absolute steering wheel angle x to maintain straight movement of the vehicle 101 defines an offset μ that is below an offset threshold, e.g., 1 degree, 2 degrees, etc. . . . When the wheels 230 are misaligned, the steering wheel angle x to maintain straight movement of the vehicle 101 defines an offset μ above the offset threshold. That is, when the wheels 230 are misaligned, the steering wheel can rotate beyond the offset threshold to compensate for the misaligned wheels 230. Upon identifying the wheel misalignment fault, the computer 105 can, e.g., notify a user over the network 125, notify a repair station over the network 125, etc.

The steering rack 225 transfers rotational motion of the steering column 210 to rotation of the wheels 230 of the vehicle. The steering rack 225 is engaged with the rotators that translate rotational motion of the steering assist motor 215 to translational motion of the steering rack 225, e.g., a rigid bar or shaft having teeth engaged with the steering assist motor 215.

The vehicle 101 includes one or more wheels 230. FIG. 2 shows two wheels 230. The wheels 230 allow the vehicle 101 to move along the roadway. The wheels 230 can be connected to the steering rack 225 via, e.g., a steering knuckle 240.

Figure 4A:
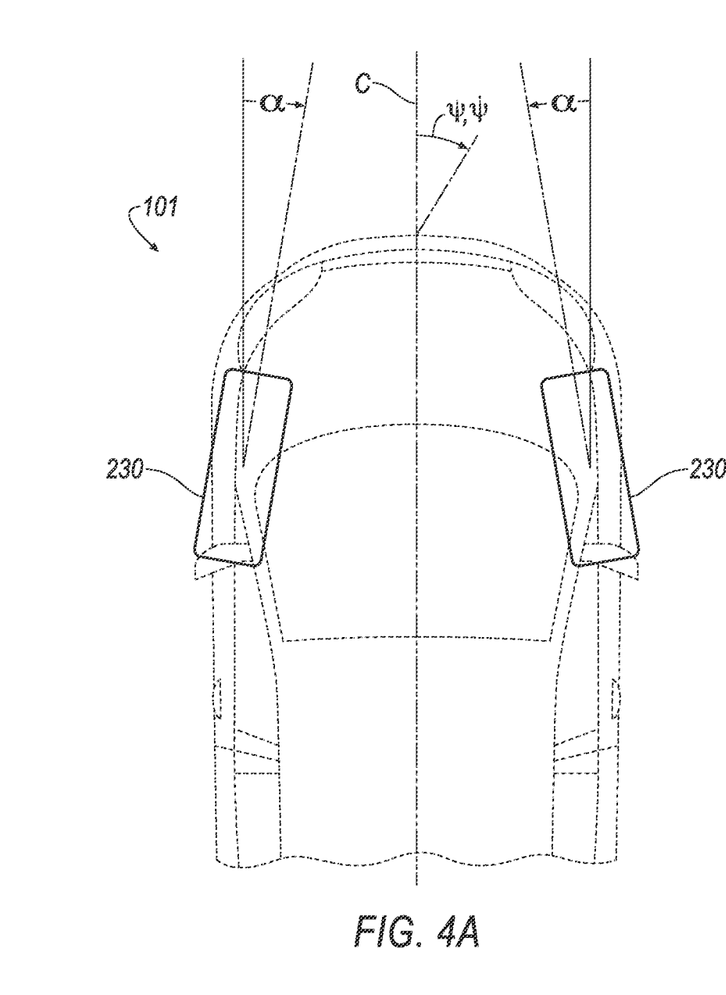
FIGS. 4A-4B are plan views of an example vehicle.
Figure 4B:
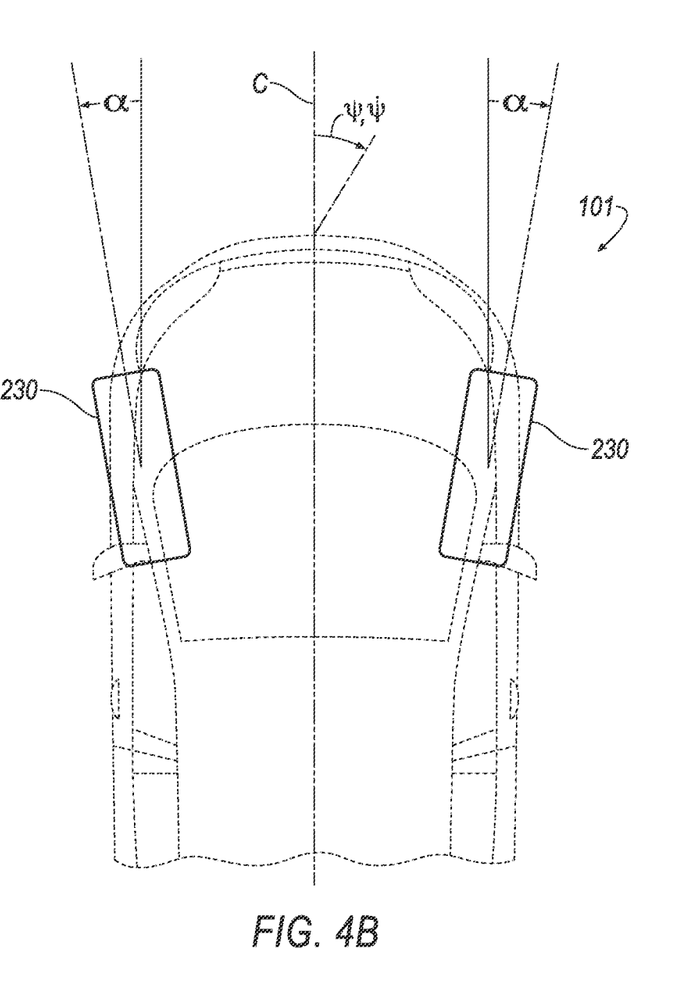

FIGS. 4A and 4B show a vehicle 101 with misaligned wheels 230. FIG. 3A shows wheels 230 misaligned in a "toe in" configuration, and FIG. 3B shows the wheels 230 misaligned in a "toe out" configuration. As used herein, "toe" is defined as the angle α between a center line of a wheel 230 parallel to a center line C of the vehicle 101 and a line extending in the direction that the wheel 230 faces. When the wheel 230 faces toward the center line C of the vehicle 101, the angle α is "toe in." When the wheel 230 faces away from the center line C of the vehicle 101, the angle α is "toe out." FIG. 3A shows two wheels 230 with toe in, and FIG. 3B shows two wheels 230 with toe out. Alternatively, not shown in the Figures, the vehicle 101 can have, e.g., one wheel 230 with toe in and another wheel 230 with toe out, one wheel 230 with toe in and another wheel 230 aligned, one wheel 230 with toe out and another wheel 230 aligned, etc. When the toe α is nonzero and the absolute steering wheel angle x is zero, the wheel can pull the vehicle 101 in the direction of the toe α, moving the vehicle 101 away from a straight path. The computer 105 can actuate the steering wheel 205 and/or the assist motor 215 to return the vehicle 101 to the straight path, resulting in an offset μ. For example, when the wheels 230 have a 1.65 degree toe out, i.e., α=−1.65, the offset μ can be 14 degrees. In another example, when the wheels 230 have a 1.10 degree toe out, i.e., α=−1.10, the offset μ can be 9 degrees. In yet another example, when the wheels 230 have a 0.55 degree toe out, i.e., α=−0.55, the offset μ can be 5 degrees.

Figure 5:
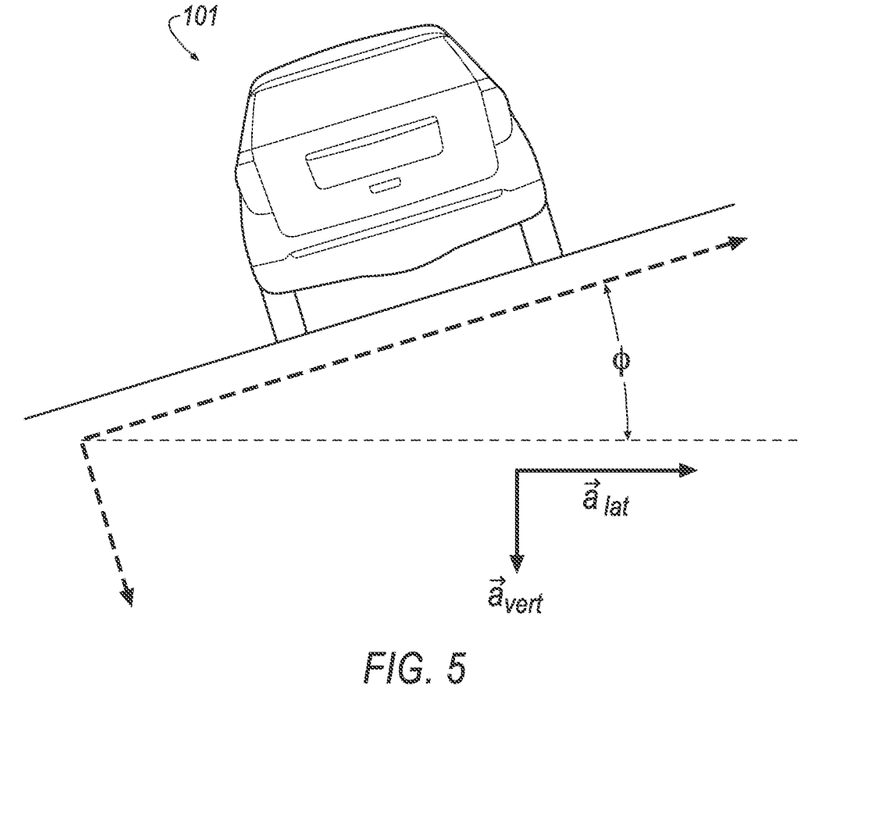
FIG. 5 is rear view of the example vehicle of FIGS. 4A-4B showing a roll angle.

FIG. 5 shows a roll angle estimation for the vehicle 101. As used herein, the "roll angle" ϕ is the angle about a longitudinal axis of the vehicle 101 relative to a horizontally flat ground in a lateral direction. The roll angle ϕ can be nonzero when, e.g., a road crown, a banked highway ramp, etc., moves one of the left side and the right side of the vehicle 101 above the other of the left side and the right side.

Figure 6:
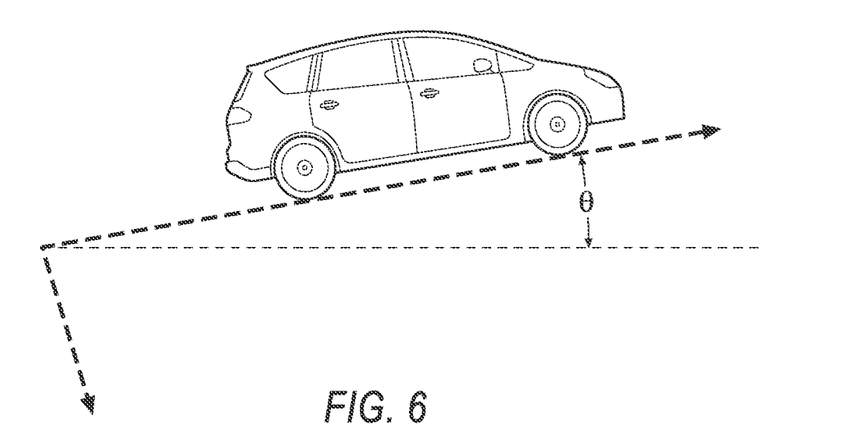
FIG. 6 is a side view of the example vehicle of FIGS. 4A-4B showing a pitch angle.

FIG. 6 shows a pitch angle of the vehicle 101. As used herein, a "pitch" angle θ is the angle about a lateral axis of the vehicle 101 relative to a horizontally flat ground in a longitudinal direction. As described below, directional components of the gravitational acceleration on the vehicle 101 can be described according to the pitch angle θ and the roll angle ϕ.

The vehicle 101 includes at least one accelerometer 110. The accelerometer 110 can determine the gravitational acceleration on the vehicle 101. The accelerometer 110 can determine the longitudinal component $a_{long}$ of gravitational acceleration of the vehicle 101 in a longitudinal direction (i.e., a longitudinal acceleration), a lateral component $a_{lat}$ of gravitational acceleration the vehicle 101 in a lateral direction (i.e., a lateral acceleration), and a vertical component $a_{vert}$ of gravitational acceleration the vehicle 101 in a vertical direction (i.e. a vertical acceleration). The acceleration components $a_{long}$, $a_{lat}$, $a_{vert}$ can be correlated to the pitch angle θ and the roll angle ϕ:

$$\begin{bmatrix} a_{long} \\ a_{lat} \\ a_{vert} \end{bmatrix} = g \begin{bmatrix} \sin(\theta) \\ -\sin(\phi)\cos(\theta) \\ -\cos(\phi)\sin(\theta) \end{bmatrix} \quad (1)$$

where g is the gravitational acceleration constant, i.e., 9.8 m/s².

Because the accelerometer 110 measures the component accelerations $a_{long}$, $a_{lat}$, $a_{vert}$, the computer 105 can determine the roll angle ϕ from the lateral acceleration and the vertical acceleration:

$$\phi = \arctan\left(\frac{a_{lat}}{a_{vert}}\right) \quad (2)$$

The roll angle ϕ can result in a steering wheel offset μ above the offset threshold even when the wheels 230 are aligned. Because one side of the vehicle 101 is above the other side of the vehicle 101 when the roll angle ϕ≠0, the vehicle 101 can turn away from the straight path, and the user can rotate the steering wheel 205 and/or the computer 105 can actuate the steering motor 215 so that the offset μ exceeds the offset threshold. For example, when the roll angle ϕ is substantially 4 degrees, the offset μ can be substantially 2 degrees, which can exceed the offset threshold of 1 degree. When the roll angle ϕ exceeds a roll angle threshold, determined based on, e.g., empirical testing, steering models, etc., the computer 105 can determine not to identify the wheel misalignment fault. When the roll angle ϕ is below the roll angle threshold, the computer 105 can determine to identify the wheel misalignment fault. The roll angle threshold can be, e.g., 3 degrees.

The computer 105 can determine a vehicle 101 speed. The computer 105 can actuate sensors 110, e.g., speedometers, to determine the vehicle 101 speed. The computer 105 can determine to identify the wheel misalignment fault when the vehicle 101 is moving substantially straight, i.e., moving along a line in a vehicle-forward direction with substantially no lateral movement, and at a speed above which the misaligned wheel 230 may result in offsets μ in the absolute steering wheel angle x. The speed threshold can be determined based on, e.g., empirical testing, steering models, etc. The speed threshold can be, e.g., 20 mph, 30 mph, etc.

The computer 105 can determine a yaw rate $\dot{\psi}$ of the vehicle 101. As shown in FIGS. 4A-4B, a "yaw angle" ψ of the vehicle 101 is the rotation of the vehicle 101 about a vertical axis, e.g., an angle θ defined between a line in a vehicle 101 forward direction and a trajectory of the vehicle 101 when the vehicle 101 turns. The "yaw rate" $\dot{\psi}$ is a time rate of change of the yaw, i.e., the rate at which the vehicle 101 turns. When the computer 105 and/or the user turns the steering wheel 205, the resulting movement of the steering rack 225 and the wheels 230 changes the yaw ψ of the vehicle 101 at the yaw rate $\dot{\psi}$. The absolute steering wheel angle x, i.e., an angle of rotation of the steering wheel 205 relative to a default position of the steering wheel 205 as described above, can correspond to a specific yaw rate $\dot{\psi}$:

$$\dot{\psi} = V \cdot \frac{x}{L} \quad (3)$$

where V is a current vehicle 101 speed and L is a wheelbase of the vehicle 101, i.e., a distance between a front axle of the vehicle 101 and a rear axle of the vehicle 101.

The computer 105 can identify the wheel misalignment fault when the vehicle 101 is moving substantially straight. To determine whether the vehicle 101 is moving substantially straight, the computer 105 can determine the yaw rate $\dot{\psi}$ for a specified period of time, and if a magnitude of the yaw rate $|\dot{\psi}|$ remains below a yaw rate threshold, the computer 105 can determine that the vehicle 101 is moving substantially straight. The yaw rate threshold can be determined based on, e.g., empirical testing, steering dynamics models, etc. The yaw rate threshold can be, e.g., 0.05 rad/s, 0.01 rad/s, etc.

To determine the yaw rate $\dot{\psi}$ for the specified period of time, the computer 105 can define and increment a yaw counter. The "yaw counter" can be an integer value that indicates a number of consecutive data 115 points of the yaw rate $\dot{\psi}$ below the yaw rate threshold. The computer 105 can collect a specified number of data 115 points during the specified period of time based on a sampling rate of the steering assist motor angle sensor 110. The computer 105 can, for each data 115 point, determine the corresponding yaw rate $\dot{\psi}$. The computer 105 can set the yaw counter to 0 upon activation of the vehicle 101. When the computer 105 determines that the magnitude of the yaw rate $|\dot{\psi}|$ is below the yaw rate threshold, the computer 105 can increment the yaw counter, i.e., increase the yaw counter by 1. Then, the computer 105 can determine the magnitude of the yaw rate $|\dot{\psi}|$ of the next data 115 point. If the magnitude of the yaw rate $|\dot{\psi}|$ is below the yaw rate threshold, the computer 105 increments the yaw counter. Otherwise, the computer 105 determines that the vehicle 101 is not moving substantially straight and resets the yaw counter to 0. The computer 105 can determine a yaw counter threshold corresponding to the number of consecutive data 115 points collected in the specified period of time. When the yaw counter exceeds the yaw counter threshold, the magnitude of the yaw rate $|\dot{\psi}|$ has remained below the yaw rate threshold for the number of consecutive data 115 points collected in the specified period of time, i.e., the vehicle 101 has moved substantially straight for the specified period of time. The computer 105 can then determine to identify the wheel misalignment fault when the yaw counter exceeds the yaw counter threshold.

To identify the wheel misalignment fault, the computer 105 can calculate statistics for the steering component angles. For example, the computer 105 can calculate statistics for the absolute steering wheel angles x. The computer 105 can determine a standard deviation a and a mean offset μ. The standard deviation σ is a measure of the variation of the absolute steering wheel angles x. The "mean" offset μ is an average of the offsets e.g., an arithmetic average, a geometric average, etc. The computer 105 can determine the standard deviation a and the mean offset μ when the vehicle 101 is moving straight, e.g., when the yaw counter exceeds the yaw counter threshold, the roll angle φ is below the roll angle threshold, etc. Alternatively, the computer 105 can identify the wheel misalignment fault based on statistics of the steering pinion angles, e.g., a standard deviation σ of the pinion angles and a mean offset μ of the steering pinion angles as described for the absolute steering wheel angles x below.

The computer 105 can determine an ordered set of absolute steering wheel angles x. The computer 105 can actuate the sensor 110 to collect data 115 of the relative steering angle $\xi_{rel}$. Each data 115 point can be collected according to the sampling rate of the sensor 110. The computer 105 can order the data 115 into an ordered set of relative steering angles $\xi_{rel}$, e.g., the computer 105 can, upon receiving a data 115 point from the sensor 110 corresponding to a relative steering angle $\xi_{rel}$, record the data 115 point in an array after the immediately previously received data 115 point. The computer 105 can determine an absolute steering wheel angle x corresponding to each relative steering angle $\xi_{rel}$ in the array in the order in which the array is stored, recording the absolute steering wheel angles x as an "ordered set" in the order of capture from the sensor 110. That is, for an ordered set of N data points 115 and i is an integer between 0 and N, the ith absolute steering wheel angle $x_i$ can be determined:

$$x_i = \xi_{rel,i} + \mu_{i-1} \quad (4)$$

where $\xi_{rel,i}$ is the ith term in the ordered set of relative steering angles $\xi_{rel}$ and $\mu_{i-1}$ is the i–1th offset. The computer 105 can determine the first absolute steering wheel angle $x_1 = \xi_{rel,1} + \mu_0$, i.e., with the initial offset $\mu_0$, because there is no previously determined offset for the first absolute steering wheel angle $x_1$. The ordered set of absolute steering wheel angle includes the first absolute steering wheel angle $x_1$ and a last absolute steering wheel angle $x_N$.

The computer 105 can determine recursive statistics of the steering wheel angles x. As used herein, "recursive" means "calculated based on an immediately preceding value." The "recursive" standard deviation σ is based on an immediately preceding value of the standard deviation a determined by the computer 105. The "recursive" mean offset μ is based on an immediately preceding value of the mean offset μ determined by the computer 105. For the ordered set of absolute steering wheel angle x, the computer 105 can iteratively determine the recursive standard deviation σ and the recursive mean offset μ for each data 115 point in the ordered set.

The computer 105 can determine the recursive standard deviation σ(N) and the recursive mean offset μ(N) for an ordered set of N absolute steering wheel angle $\{x_1, x_2, \ldots x_N\}$. Starting with the first absolute steering wheel angle $x_1$ and the second absolute steering wheel angle $x_2$, the computer 105 can determine a first standard deviation σ(1). Then, for each i∈[2, N], the computer 105 can determine the ith standard deviation σ(i) based on the previously determined standard deviation σ(i–1), the ith mean offset μ(i), and the ith steering when angle $x_i$:

$$\sigma(i) = \sqrt{\left(\sigma(i-1)^2 + \frac{(x_i - \mu(i))^2}{i-2}\right)\left(\frac{i-2}{i-1}\right)} \quad (5)$$

$$\mu(i) = \frac{i-1}{i}\left(\mu(i-1) + \frac{x_i}{i-1}\right) \quad (6)$$

The number of data points N in the ordered set can be determined based on, e.g., statistical modeling, steering models, etc., and can be, e.g., 200 data points. The computer 105 can determine a last recursive standard deviation σ(N) and a last recursive mean offset μ(N):

$$\sigma(N) = \sqrt{\left(\sigma(N-1)^2 + \frac{(x_N - \mu(N))^2}{N-2}\right)\left(\frac{N-2}{N-1}\right)} \quad (7)$$

$$\mu(N) = \frac{N-1}{N}\left(\mu(N-1) + \frac{x_N}{N-1}\right) \quad (8)$$

Thus, the last recursive standard deviation σ(N) and the last recursive mean offset μ(N) are based at least in part on the penultimate, i.e., next-to-last, standard deviation σ(N–1), the penultimate mean μ(N–1), and the last absolute steering wheel angle $x_N$.

The computer 105 can identify the wheel misalignment fault based on the recursive standard deviation σ(N) and the recursive mean offset μN). The computer 105 can determine whether the recursive standard deviation σ(N) is below a standard deviation threshold. When the recursive standard deviation σ(N) is below the standard deviation threshold, the computer 105 can determine that the absolute steering wheel angles x have low variance and are accurate and can then determine to identify the wheel misalignment fault. When the recursive standard deviation σ(N) is above the standard deviation threshold, the computer 105 can determine that the absolute steering wheel angles x have high variance and are inaccurate. The computer 105 can then collect a new ordered set of absolute steering wheel angles x. The standard deviation threshold can be determined based on, e.g., statistical models, steering models, etc. The standard deviation threshold can be, e.g., 0.05.

When the recursive standard deviation σ(N) is below the standard deviation threshold, the computer 105 can determine whether the recursive mean offset μ(N) is above the offset threshold. When the recursive mean offset μ(N) is below the offset threshold, the computer 105 can determine that there is no wheel misalignment fault, i.e., the wheels 230 are not misaligned. When the recursive mean offset μ(N) is above the offset threshold, the computer 105 can identify the wheel misalignment fault.

When the vehicle 101 is operating in the autonomous mode or the semi-autonomous mode, it is a problem to detect misaligned wheels 230. In certain scenarios it is impossible for a misalignment to be detected and/or reported by a human. In such scenarios, conventional techniques, such as a human detecting vehicle vibration or steering "pull" are to no avail. Advantageously, misaligned wheels 230 can be detected when the computer 105 executed programming to actuate the steering component 200 to steer the misaligned wheels 230, moving a steering wheel 205 away from a default position. The computer 105 can determine absolute steering wheel angles x based on rotation of the steering assist motor 215 that results in movement of the steering wheel 205. Determining the recursive standard deviation σ(N) and the recursive mean offset μ(N) of the ordered set of the absolute steering wheel angles x allows the computer 105 to identify that one or more wheels 230 are misaligned. Using the rotation angles of the steering assist motor 215 to determine the absolute steering wheel angles x, the computer 105 can identify the wheel misalignment fault. Thus, the computer 105 addresses the problem of detecting misaligned wheels 230 by analyzing actuation of the steering component 200.

Figure 7:
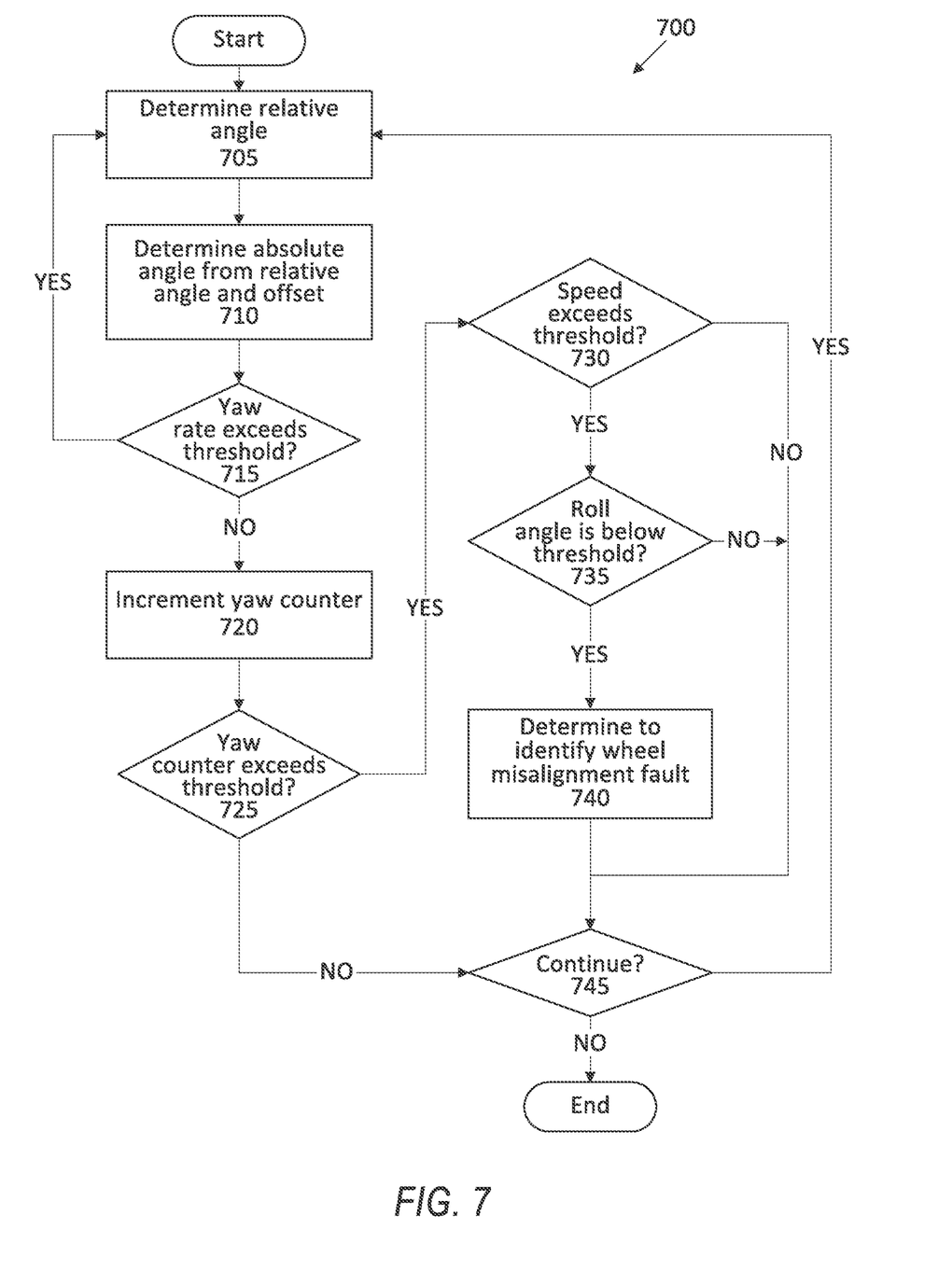
FIG. 7 is a block diagram of an example process for determining when to identify the wheel misalignment fault.

FIG. 7 illustrates an example process 700 for determining when to calculate the recursive standard deviation of the steering wheel angle. The process 700 begins in a block 705, in which the computer 105 determines a relative steering wheel angle $\mu_{rel}$. As described above, the computer 105 can determine the relative steering wheel angle $\xi_{rel}$ based on rotation of the steering assist motor 215 and a transfer function, as described above, that correlates rotation of the steering assist motor 215 to the relative steering wheel angle $\mu_{rel}$.

Next, in a block 710, the computer 105 determines an absolute steering wheel angle x based on the relative steering wheel angle $\xi_{rel}$ and a predetermined offset $\mu_0$. As described above, the predetermined offset $\mu_0$ can be determined based on a reference absolute steering wheel angle $x_{ref}$ that can be stored in the data store 106. The reference absolute steering wheel angle $x_{ref}$ can be determined based on, e.g., empirical testing, steering models, etc.

Next, in a block 715, the computer 105 determines whether a magnitude of a yaw rate $|\psi|$ of the vehicle 101 is below a yaw rate threshold. When the yaw rate $|\psi|$ is below the yaw rate threshold, the vehicle 101 can move substantially straight, and the absolute steering wheel angle x can result from a misaligned wheel 230 rather than conventional vehicle 101 operation. As described above, the absolute steering wheel angle x can correlate to the yaw rate $|\psi|$ of the vehicle 101. The yaw rate threshold can be determined based on, e.g., empirical testing, steering models, etc. The yaw rate threshold can be, e.g., 0.05 rad/s, 0.01 rad/s, etc. If the magnitude of the yaw rate $|\psi|$ is below the yaw rate threshold, the process 700 continues in a block 720. Otherwise, the computer 105 resets a yaw counter, as described below, and the process 700 returns to the block 705.

In the block 720, the computer 105 increments the yaw counter. As described above, persistent yaw rates of the vehicle 101 exceeding the yaw rate threshold can indicate that one or more wheels 230 are misaligned and temporary yaw rates above the yaw rate threshold can indicate conventional vehicle 101 operation, e.g., turning, lane changing, etc.

Next, in a block 725, the computer 105 determines whether the yaw counter exceeds a yaw counter threshold. To distinguish between a misaligned wheel 230 and conventional vehicle 101 operation, the yaw counter threshold can be determined to correspond to a period of time beyond which conventional vehicle 101 operation could end. The yaw counter threshold can be determined based on, e.g., empirical testing, steering models, etc. If the yaw counter exceeds the yaw counter threshold, the process 700 continues in a block 730. Otherwise, the process 700 continues in a block 745.

In the block 730, the computer 105 determines whether a current vehicle 101 speed exceeds a speed threshold. As described above, the computer 105 can determine the recursive standard deviation when the vehicle 101 is moving substantially straight and at a speed above which the misaligned wheel 230 may result in offsets μ in the absolute steering wheel angle x. The speed threshold can be determined based on, e.g., empirical testing, steering models, etc. The speed threshold can be, e.g., 20 mph, 30 mph, etc. If the current vehicle 101 speed exceeds the speed threshold, the process 700 continues in a block 735. Otherwise, the process 700 continues in the block 745.

In the block 735, the computer 105 determines whether a roll angle ϕ is below a roll angle threshold. As described above, when the roll angle ϕ exceeds the roll angle threshold, the offset μ can be above the offset threshold while the wheels 230 are aligned. To reduce the effect of the roll angle ϕ on the offset μ, the computer 105 can determine to identify the wheel misalignment fault when the roll angle ϕ is below the roll angle threshold. If the roll angle ϕ is below the roll angle threshold, the process 500 continues in a block 740. Otherwise, the process 700 continues in the block 745.

In the block 740, the computer 105 determines to identify the wheel misalignment fault. The computer 105 can identify the wheel misalignment fault based on recursive statistics of an ordered set of absolute steering wheel angles x, as described above. For example, the computer 105 can identify the wheel misalignment fault according to an example process 800 below.

In the block 745, the computer 105 determines whether to continue the process 700. For example, if the vehicle 101 is powered off, the computer 105 can determine not to continue the process 700. If the computer 105 determines to continue, the process 700 returns to the block 705 to collect additional data 115. Otherwise, the process 700 ends.

Figure 8:
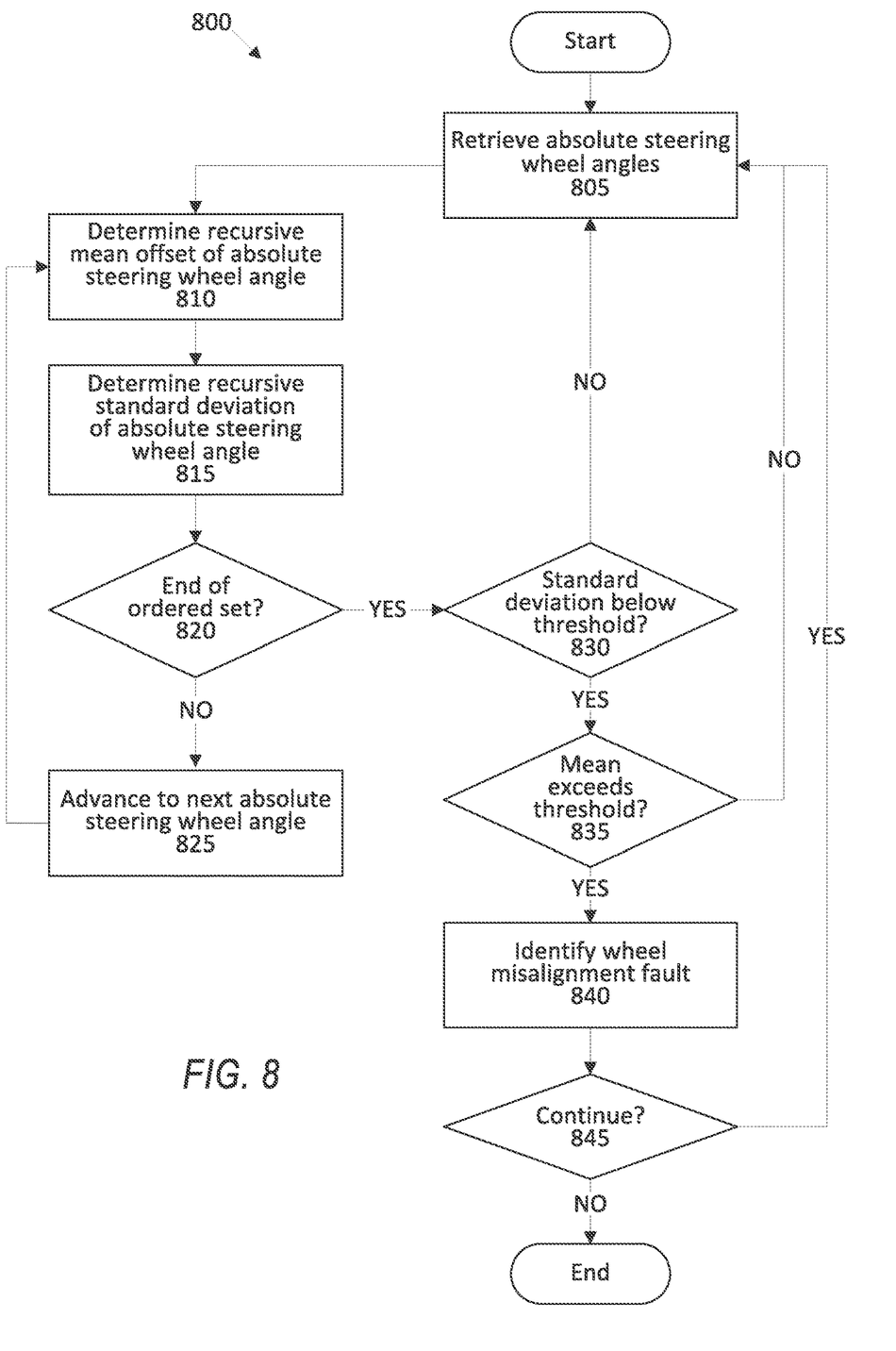
FIG. 8 is a block diagram of an example process for identifying the wheel misalignment fault.

FIG. 8 is a block diagram of an example process 800 for identifying a wheel misalignment fault. The process 800 begins in a block 805, in which the computer 105 retrieves an ordered set of absolute steering wheel angles x. As described above, the ordered set of absolute steering wheel angle x is an array of absolute steering wheel angles x ordered based on a sampling rate of a sensor 110. The ordered set of absolute steering wheel angles x can have N values of absolute steering wheel angle x, i.e., $\{x_1, x_2 \ldots x_N\}$.

Next, in a block 810, the computer 105 determines a recursive mean offset μ for the ith term in the ordered set, where i∈[1,N]. As described above, the computer 105 can determine the recursive mean offset μ(i) based on an immediately preceding recursive mean offset μ(i−1).

Next, in a block 815, the computer 105 determines a recursive standard deviation σ(i) for the ith term in the ordered set. As described above, the computer 105 can determined the recursive standard deviation σ(i) based on an immediately preceding recursive standard deviation σ(i−1).

Next, in a block 820, the computer 105 determines whether the computer 105 has reached the end of the ordered set. The computer 105 determines whether i=N for an ordered set with N terms. If the computer 105 has reached the end of the ordered set, the process 800 continues in a block 830. Otherwise, the process 800 continues in a block 825.

In the block 825, the computer 105 advances to the next absolute steering wheel angle x in the ordered set. The computer 105 can increment the index i to i+1. The process 800 continues in the block 815.

In the block 830, the computer 105 determines whether the recursive standard deviation σ(N) is below a standard deviation threshold. As described above, when the computer 105 determines that the recursive standard deviation σ(N) is below the standard deviation threshold, the computer 105 can determine that the absolute steering wheel angles x were reliably collected. If the recursive standard deviation σ(N) is below the standard deviation threshold, the process 800 continues in a block 835. Otherwise, the process 800 returns to the block 805 to collect additional data 115.

In the block 835, the computer 105 determines whether the recursive mean offset $\mu_N$ is above a mean offset threshold. As described above, when the recursive mean offset $\mu_N$ is above the mean offset threshold, the steering wheel 205 is turned to compensate the vehicle 101 moving away from a straight path. If the recursive mean offset $\mu_N$ is above the mean offset threshold, the process 800 continues in a block 840. Otherwise, the process 800 returns to the block 805 to collect additional data 115.

In the block 840, the computer 105 identifies a wheel misalignment fault. The recursive mean offset $\mu_N$ can indicate that the wheels 230 are misaligned, e.g., the wheels 230 are in a toe in configuration, the wheels 230 are in a toe out configuration, etc. Upon identifying the wheel misalignment fault, the computer 105 can, e.g., notify a user over the network 125, notify a repair station over the network 125, etc.

Next, in a block 845, the computer 105 determines whether to continue the process 800. For example, the computer 105 can determine not to continue the process 800 when the vehicle 101 is powered off. If the computer 105 determines to continue, the process 800 returns to the block 805 to collect additional data 115. Otherwise, the process 800 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   actuate a steering assist motor of a vehicle;
   identify a plurality of steering assist motor angles of the steering assist motor upon actuation of the steering assist motor;
   identify a plurality of steering component angles based on the steering assist motor angles;
   determine a recursive standard deviation and a recursive mean offset of the plurality of steering component angles; and
   determine that the recursive standard deviation is below a deviation threshold and the recursive mean offset is above an offset threshold and then identify a wheel misalignment fault indicating that a wheel of the vehicle is misaligned.

2. The system of claim 1, wherein the instructions further include instructions executable by the processor to determine a vehicle yaw rate and to determine the recursive standard deviation and the recursive mean offset upon determining that the vehicle yaw rate is below a yaw rate threshold.

3. The system of claim 2, wherein the instructions further include instructions executable by the processor to increment a yaw counter upon determining that the yaw rate is below the yaw rate threshold and to determine the recursive standard deviation and the recursive mean offset upon determining that the yaw counter exceeds a yaw counter threshold.

4. The system of claim 3, wherein the instructions include instructions executable by the processor to reset the yaw counter upon determining that the yaw rate exceeds the yaw rate threshold.

5. The system of claim 1, wherein the instructions further include instructions executable by the processor to:
determine a roll angle based on a lateral acceleration and a vertical acceleration; and
determine the recursive standard deviation and the recursive mean offset upon determining that the roll angle is below a roll angle threshold.

6. The system of claim 1, wherein the instructions further include instructions executable by the processor to collect a second plurality of steering component angles upon determining that the recursive standard deviation is above the deviation threshold.

7. The system of claim 1, wherein the instructions further include instructions executable by the processor to determine that the vehicle is moving straight and to determine, in response to determining that the vehicle is moving straight, the recursive standard deviation and the recursive mean offset of the plurality of steering component angles.

8. The system of claim 1, wherein the instructions further include instructions executable by the processor to determine that a vehicle speed is above a speed threshold and, upon determining that the vehicle speed is above the speed threshold, to determine the recursive standard deviation and the recursive mean offset of the plurality of steering component angles.

9. The system of claim 1, wherein the plurality of steering component angles is a plurality of steering wheel angles.

10. The system of claim 1, wherein the plurality of steering component angles is a plurality of steering pinion angles.

11. The system of claim 1, wherein the plurality of steering component angles is an ordered set of steering component angles including a first steering component angle and a last steering component angle.

12. The system of claim 11, wherein the instructions to determine the recursive standard deviation further include instructions executable by the processor to determine a first standard deviation based on the first steering component angle and a second steering component angle in the ordered set of steering component angles, to determine a second standard deviation based on the first standard deviation and a third steering component angle, to determine a penultimate standard deviation based on the first standard deviation and the last steering component angle, and to determine the recursive standard deviation based on the last steering component angle and the penultimate standard deviation.

13. A method, comprising:
actuating a steering assist motor of a vehicle;
identifying a plurality of steering assist motor angles of the steering assist motor upon actuation of the steering assist motor;
identifying a plurality of steering component angles based on the steering assist motor angles;
determining a recursive standard deviation and a recursive mean offset of the plurality of steering component angles; and
determining that the recursive standard deviation is below a deviation threshold and the recursive mean offset is above an offset threshold and then identifying a wheel misalignment fault indicating that a wheel of the vehicle is misaligned.

14. The method of claim 13, further comprising determining a vehicle yaw rate and determining the recursive standard deviation and the recursive mean offset upon determining that the vehicle yaw rate is below a yaw rate threshold.

15. The method of claim 13, further comprising determining a roll angle based on a lateral acceleration and a vertical acceleration and determining the recursive standard deviation and the recursive mean offset upon determining that the roll angle is below a roll angle threshold.

16. The method of claim 13, further comprising determining that the vehicle is moving straight and then determining the recursive standard deviation and the recursive mean offset of the plurality of steering component angles.

17. A system, comprising:
a steering assist motor of a vehicle movable to a steering assist motor angle;
means for identifying a plurality of steering assist motor angles of the steering assist motor upon actuation of the steering assist motor;
means for identifying a plurality of steering component angles based on the steering assist motor angles;
means for determining a recursive standard deviation and a recursive mean offset of the plurality of steering component angles; and
means for determining that the recursive standard deviation is below a deviation threshold and the recursive mean offset is above an offset threshold and then identifying a wheel misalignment fault indicating that a wheel of the vehicle is misaligned.

18. The system of claim 17, further comprising means for determining a vehicle yaw rate and means for determining the recursive standard deviation and the recursive mean offset upon determining that the vehicle yaw rate is below a yaw rate threshold.

19. The system of claim 17, further comprising means for determining a roll angle based on a lateral acceleration and a vertical acceleration and means for determining the recursive standard deviation and the recursive mean offset upon determining that the roll angle is below a roll angle threshold.

20. The system of claim 17, further comprising means for determining that the vehicle is moving straight and means for determining, the recursive standard deviation and the recursive mean offset of the plurality of steering component angles upon determining that the vehicle is moving straight.

* * * * *